(12) United States Patent
Wu

(10) Patent No.: US 7,147,323 B1
(45) Date of Patent: Dec. 12, 2006

(54) SUN HAT WITH EYEGLASSES

(75) Inventor: Chien-Hsiang Wu, No. 107, Lane 702, Sec. 1, Anjhong Rd., Tainan City (TW)

(73) Assignees: Chin-Shih Wang, Tainan County (TW); Chien-Hsiang Wu, Tainan (TW)

( * ) Notice: Subject to any disclaimer, the term of this patent is extended or adjusted under 35 U.S.C. 154(b) by 0 days.

(21) Appl. No.: 11/257,986

(22) Filed: Oct. 26, 2005

(51) Int. Cl.
*G02C 3/00* (2006.01)

(52) U.S. Cl. .................... 351/155; 2/10; 2/453
(58) Field of Classification Search ............... 351/41, 351/155, 158; 2/10, 12, 13, 15, 453
See application file for complete search history.

(56) References Cited

U.S. PATENT DOCUMENTS 5,347,655 A * 9/1994 Garrett ................... 2/10

6,491,390 B1 * 12/2002 Provost .................. 351/155

* cited by examiner

*Primary Examiner*—Huy Mai
(74) *Attorney, Agent, or Firm*—Rosenberg, Klein & Lee

(57) ABSTRACT

A sun hat includes a main body, a curve visor, two supporting members, and a pair of eyeglasses; the supporting members each have a holding portion, and a folded fixing portion extending from one end of the holding portion; the holding portions have tooth-shaped protrusions on an inner side; the supporting members are secured to the visor with two opposed parts of the folded fixing portions being tightly pressed on two sides of the visor; the eyeglasses have a sleeve part on each of two ends thereof, which has outer tooth-shaped protrusions; the eyeglasses are supported on the supporting members with the sleeve parts being held in the holding portions, and with the tooth-shaped protrusions of the sleeve parts engaging the tooth-shaped protrusions of the holding portions such that the eyeglasses can be pivoted from an in-use position to a not-in-use one, and adjusted in position.

4 Claims, 5 Drawing Sheets

US 7,147,323 B1

SUN HAT WITH EYEGLASSES

BACKGROUND OF THE INVENTION

1. Field of the Invention

The present invention relates to a sun hat with eyeglasses, more particularly one, whose eyeglasses can be, when not in use, pivoted so as to be close to a lower side of the visor thereof, and can be adjusted in position to suit different users.

2. Brief Description of the Prior Art

People usually wear hats to block direct sunlight and prevent heatstroke when taking a walk or doing outdoor exercises. Furthermore, people usually wear sunglasses to protect the eyes from the sun's damaging rays.

When people get indoors, and take off the sunglasses, they can put the sunglasses in their clothing pockets, on top of their hats or in their handbags. No matter which one of the above ways is used, there is risk of the sunglasses getting damaged. And, the sunglasses are prone to fall off if they are positioned on top of hats.

SUMMARY OF THE INVENTION

It is a main object of the invention to provide a sun hat with eyeglasses to overcome the above-mentioned problems. The sun hat of the present invention includes a main body, a curve visor, two supporting members, and a pair of eyeglasses. The supporting members each have a holding portion, and a folded fixing portion extending from one end of the holding portion. The holding portions have tooth-shaped protrusions on an inner side. The supporting members are secured to the visor with two opposed parts of each of the folded fixing portions being tightly pressed on two sides of the visor. The eyeglasses have a sleeve part on each of two ends thereof, which has tooth-shaped protrusions on an outer side. The eyeglasses are supported on the supporting members with the sleeve parts being held in the holding portions, and with the tooth-shaped protrusions of the sleeve parts engaging the tooth-shaped protrusions of the holding portions such that the eyeglasses can be pivoted from an in-use position to a not-in-use one, and adjusted in position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
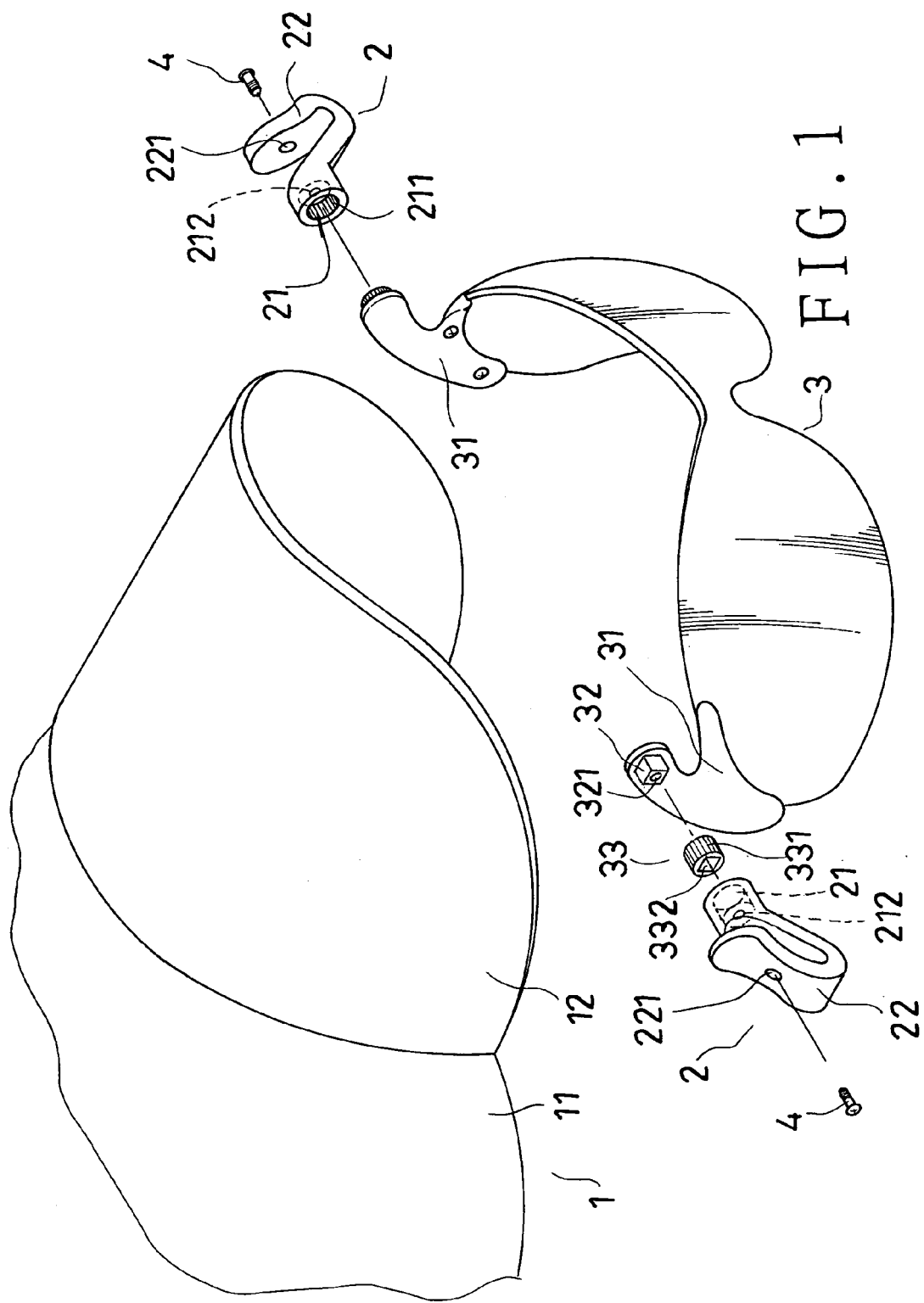
FIG. 1 is an exploded perspective view of the sun hat with eyeglasses in the present invention.
Figure 2:
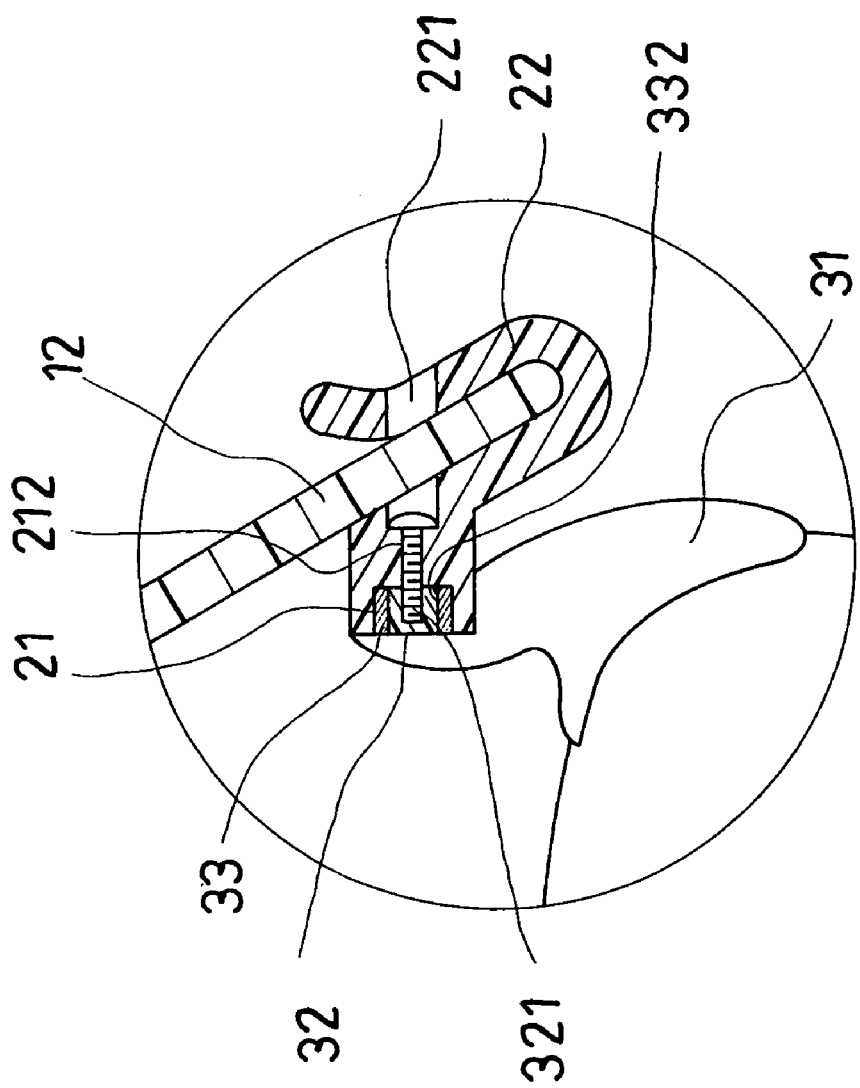
FIG. 2 is a partial lateral sectional view of the present invention.
Figure 3:
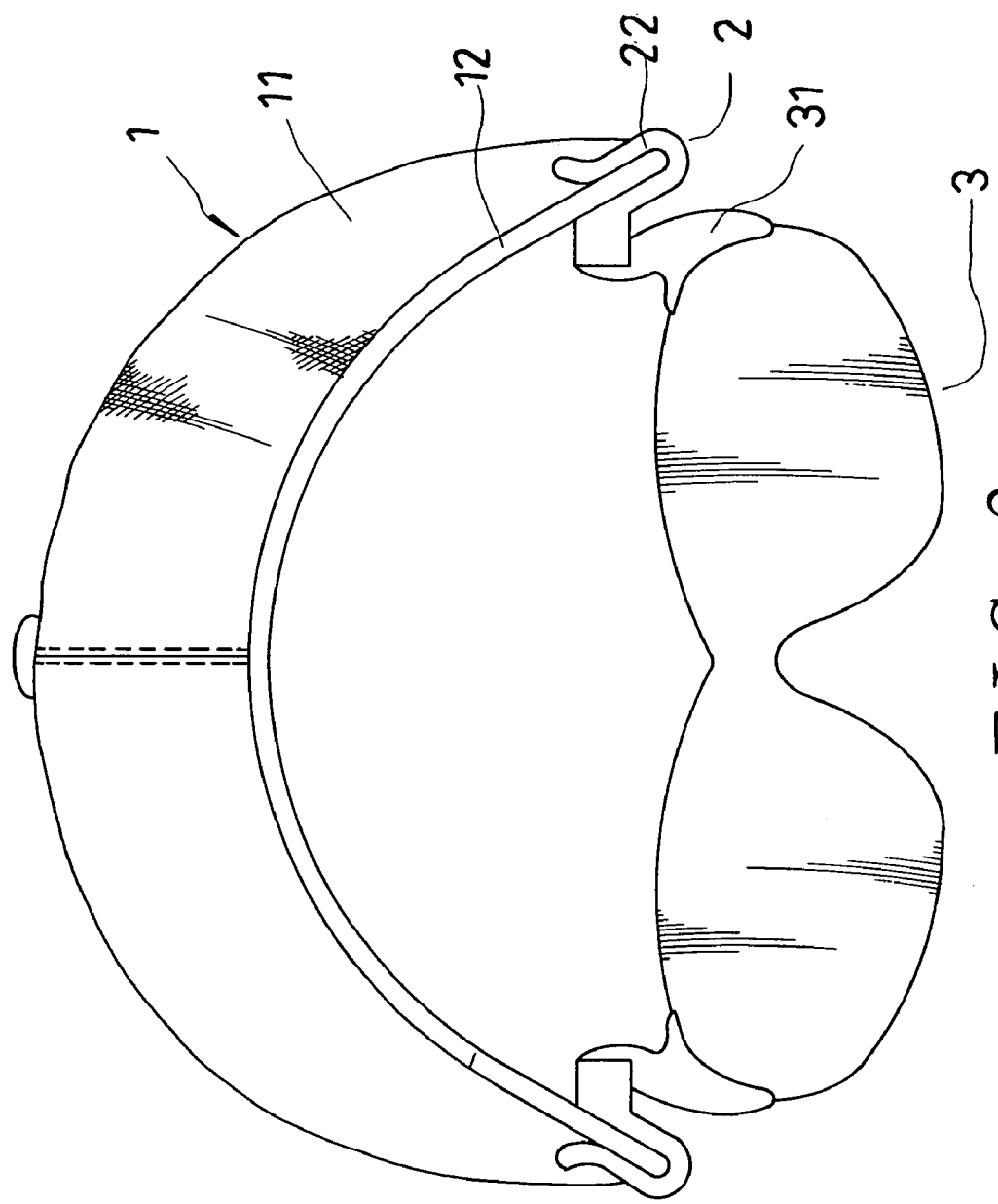
FIG. 3 is a front view of the present invention.

Referring to FIGS. 1 to 5, a preferred embodiment of a sun hat with eyeglasses in the present invention includes a sun hat 1, two supporting members 2, and a pair of eyeglasses 3.

The sun hat 1 includes a main body 11, and a visor 12 having a certain curvature.

Each of the supporting members 2 has a hollow holding portion 21, and a folded fixing portion 22 extending from an outward end of the hollow holding portion 21; the hollow holding portion 21 is formed with several tooth-shaped protrusions 211 on an inner side, and a through hole 212 on the outward end thereof; the folded fixing portion 22 has a through hole 221 aligned with the through hole 211 of the hollow holding portion 21, and it includes two opposed parts, which are so close to each other that when the visor 12 of the sun hat 1 is inserted between them, the visor 12 will be tightly pressed between them, and the supporting member 2 will be secured to the visor 12.

The eyeglasses 3 have an extension portion 31 at each of two ends thereof, a block-shaped protrusion 32 on each of the extension portions 31, and a sleeve part 33 positioned around each of the block-shaped protrusions 32; the block-shaped protrusions 32 are polygonal, and each have a connecting hole 321; the sleeve parts 33 each have a polygonal holding hole 332, and several tooth-shaped protrusions 331 on an outer side thereof.

In assembly, the polygonal block-shaped protrusions 32 of the eyeglasses 3 are fitted in respective ones of the polygonal holding holes 332 of the sleeve parts 33, and the supporting members 2 are fitted around respective ones of the sleeve parts 33 at the hollow holding portions 21 thereof. And, connecting elements 4 are passed through the through holes 212 of the hollow holding portions 21 of the supporting members 2 via the through holes 221 of the folded fixing portions 22, and they are passed into the connecting holes 321, and securely joined to the block-shaped protrusions 32 of the eyeglasses 3. Next, the supporting members 2 are secured to the visor 12 of the sun hat 1 with the visor 12 being tightly pressed between the folded fixing portions 22 thereof.

Figure 4:
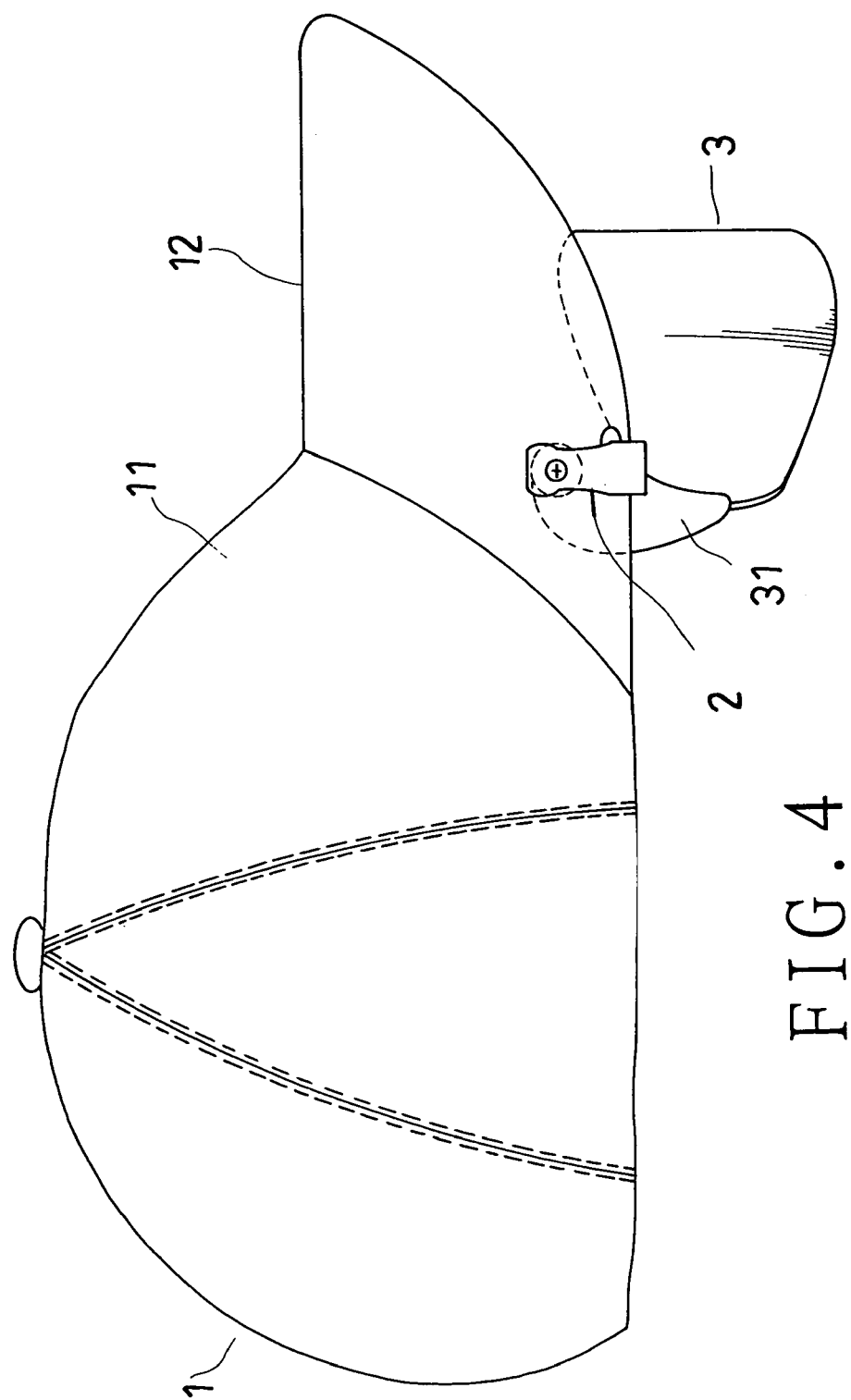
FIG. 4 is a side view of the present invention with the eyeglasses in the in-use position.
Figure 5:
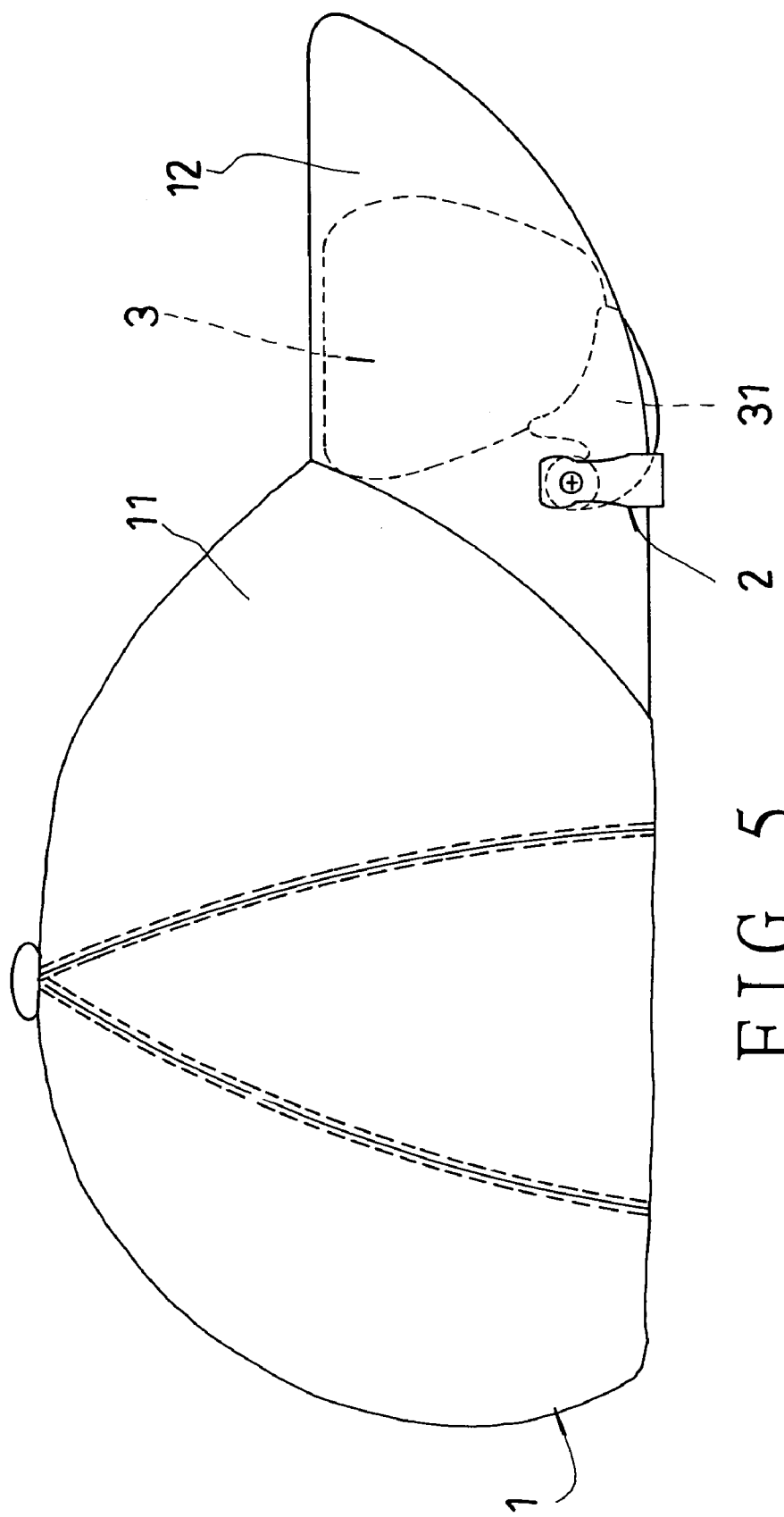
FIG. 5 is a side view of the present invention with the eyeglasses in the not-in-use position.

The outer tooth-shaped protrusions 331 of the sleeve parts 3 will slightly engage the inner tooth-shaped protrusions 211 of the supporting members 2; thus, the eyeglasses 3 are normally held in position by means of the supporting members 2, and they can be pivoted on the supporting members 2 to change orientation in relation to the sun hat 1 by means of exerting force on them, as shown in FIGS. 4 and 5.

Therefore, the eyeglasses 4 can be pivoted to the in-use position for protecting the eyes of the wearer of the sun hat 1 from sunlight damage, as shown in FIG. 4. Referring to FIG. 5, the eyeglasses 4 can be pivoted upwards so as to be close to the visor 12 when the wearer of the sun hat 1 doesn't want to use the eyeglasses 4. And, the eyeglasses 3 can be adjusted in orientation according to the wearer's need.

From the above description, it can be easily seen that having the present sun hat with eyeglasses, the user won't have to carry an additional pair of sunglasses, and the eyeglasses can block wind besides protecting the user's eyes from sunlight damage. And, the eyeglasses are pleasant-looking, and adjustable to a comfortable position. Furthermore, there will be less risk of the eyeglasses getting lost.

What is claimed is:

1. A sun hat with eyeglasses, comprising
    (a) a sun hat including a main body, and a visor;
    (b) two supporting members joined to the visor; each of the supporting members having:
        a hollow holding portion; the hollow holding portion being formed with a plurality of tooth-shaped protrusions on an inner side thereof; and
        a folded fixing portion extending from an outward end of the hollow holding portion; the folded fixing portion being connected to the visor with two opposed parts thereof being tightly pressed on two sides of the visor, thus securing the supporting member to the visor; and (c) a pair of eyeglasses; the eyeglasses having:

an extension portion at each of two ends thereof; and a sleeve part on each of the extension portion thereof; the sleeve parts each having a plurality of tooth-shaped protrusions on an outer side thereof; the eyeglasses being supported on the supporting members with the sleeve parts being held in respective ones of the hollow holding portions, and with the tooth-shaped protrusions of the sleeve parts engaging the tooth-shaped protrusions of the hollow holding portions.

2. The sun hat with eyeglasses as claimed in claim 1, wherein the hollow holding portions of the supporting members each have a through hole on an outward end thereof, and the folded fixing portions each have a through hole aligned with the through hole of a corresponding hollow holding portion; connecting elements being passed through the through holes of the hollow holding portions via the through holes of the folded fixing portions, and secured to the sleeve parts of the eyeglasses.

3. The sun hat with eyeglasses as claimed in claim 1, wherein the eyeglasses have a polygonal block-shaped protrusion secured on each of the extension portions thereof; each of the sleeve parts having a polygonal holding hole; the block-shaped protrusions being fitted in respective ones of the polygonal holding holes of the sleeve parts such that the sleeve parts will move together with the eyeglasses when the eyeglasses are angularly displaced.

4. The sun hat with eyeglasses as claimed in claim 3, wherein the hollow holding portions of the supporting members each have a through hole on an outward end thereof, and the folded fixing portions each have a through hole aligned with the through hole of a corresponding hollow holding portion, and the polygonal block-shaped protrusions each have a connecting hole; connecting elements being passed through the through holes of the hollow holding portions via the through holes of the folded fixing portions, and passed into the connecting holes and securely joined to the block-shaped protrusions.

* * * * *